United States Patent [19]

Tachihara et al.

[11] 4,412,725
[45] Nov. 1, 1983

[54] REAR STOP DIAPHRAGM ZOOM LENS

[75] Inventors: Satoru Tachihara; Sadao Okudaira, both of Tokyo, Japan

[73] Assignee: Asahi Kogaku Kogyo Kabushiki Kaisha, Tokyo, Japan

[21] Appl. No.: 329,107

[22] Filed: Dec. 9, 1981

[30] Foreign Application Priority Data

Dec. 20, 1980 [JP] Japan ................... 55-181024

[51] Int. Cl.³ .................. G02B 9/64; G02B 15/16
[52] U.S. Cl. ................... 350/426
[58] Field of Search .......................... 350/426

[56] References Cited

U.S. PATENT DOCUMENTS 4,294,521 10/1981 Doi et al. ............. 350/426
4,380,375 4/1983 Mogami ............. 350/426

FOREIGN PATENT DOCUMENTS 55-35336 3/1980 Japan ................... 350/426

*Primary Examiner*—John K. Corbin
*Assistant Examiner*—Rebecca D. Gass
*Attorney, Agent, or Firm*—Sughrue, Mion, Zinn, Macpeak and Seas

[57] ABSTRACT

A rear stop diaphragm type zoom lens is disclosed. The zoom lens is composed, in order from the object side, of a first lens group as a whole having a negative refractive power and consisting of two negative lenses and a positive lens and a second lens group as a whole having a positive refractive power and consisting of two or three positive lenses, a negative lens and one or two lenses including at least one positive lens. An aerial space between the lens groups is varied to thereby vary the magnification, and a stop diaphragm is disposed behind the overall lens system with the stop diaphragm being maintained at a constant position with respect to the focusing surface during variation of magnification.

4 Claims, 11 Drawing Figures

REAR STOP DIAPHRAGM ZOOM LENS

BACKGROUND OF THE INVENTION

The present invention relates to a zoom lens system, and more particularly a so-called rear stop diaphragm type zoom lens in which a stop diaphragm is disposed behind the lens system on the image side and a position of the stop diaphragm is maintained constant with respect to the image focusing surface during the variation of magnification.

Recently, zoom lenses have remarkably been developed particularly for single lens reflex cameras and there have been various type lenses having various view angle ranges. However, any of these lenses has a stop diaphragm disposed in its lens system. The above described rear stop diaphragm type zoom lens is not known. This is due to the fact that the rear stop diaphragm type zoom lens is perfectly asymmetrical with respect to the position of the stop diaphragm and a part of the optical system must be moved during variation of magnification. As a result, the asymmetry is also varied to cause the aberration compensation to be difficult. In addition, since generally the overall physical size of the zoom lens tends to be increased, the inlet pupil of the rear stop diaphragm type is deep to result in an increase of the diameter of the front lens. This leads to difficulty of miniaturization disadvantageously. On the other hand, since the stop diaphragm is not interposed in the lens system, the mechanical construction is extremely simplified so that the lens can be produced with low cost. Due to this economical advantage, it is very effective to use such a lens system as an interchangeable zoom lens, particularly for the SLR camera in which a stop diaphragm is disposed in a body.

SUMMARY OF THE INVENTION

In view of the above noted defects, the present invention provides as an object a rear stop diaphragm type zoom lens system enabling solving a problems caused by the above described miniaturization and by difficulty of aberration compensation, the suitable lens system being selectable from various types of lens, with a high compactness and a high performance.

DETAILED DESCRIPTION OF THE INVENTION

Figure 1:
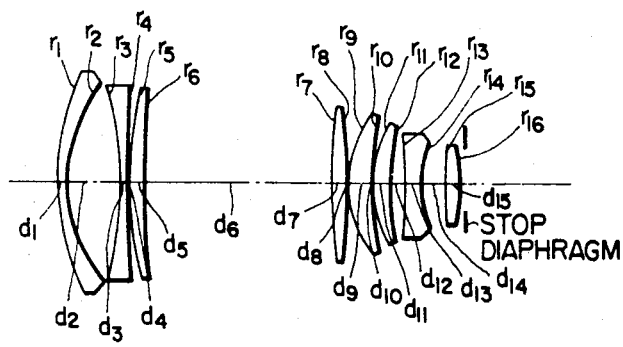
FIG. 1 shows a lens construction according to the Example 1 or 2.
Figure 2:
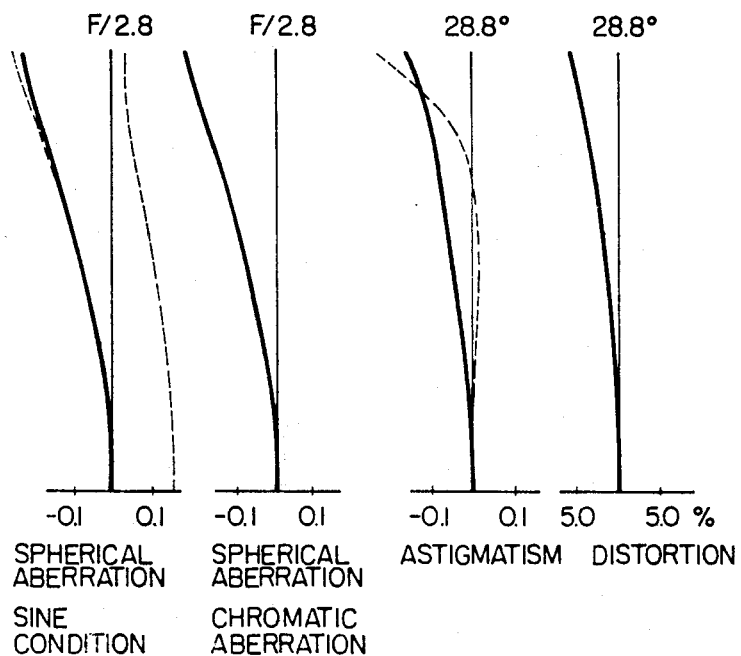
FIGS. 2, 3 and 4 are graphs showing aberrations at the minimum, intermediate and maximum focal lengths according to the Example 1.
Figure 3:
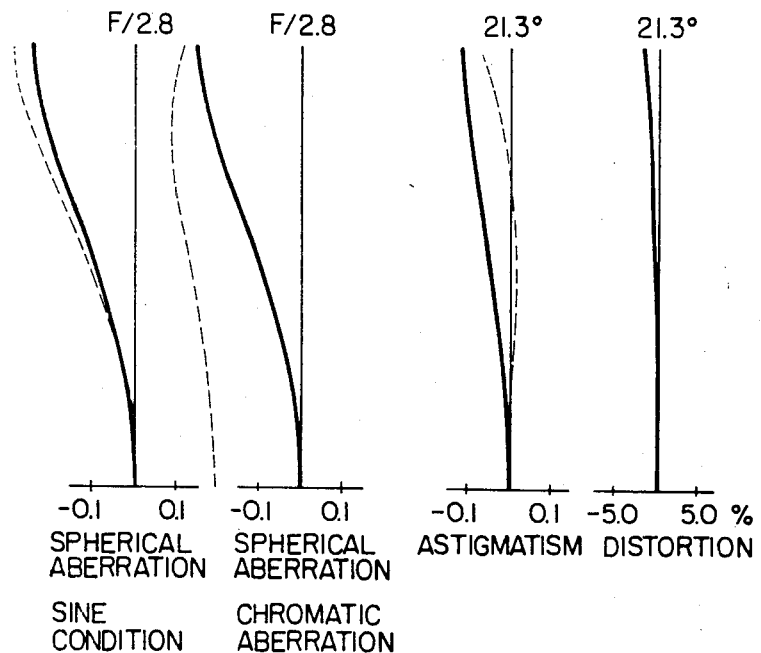
Figure 4:
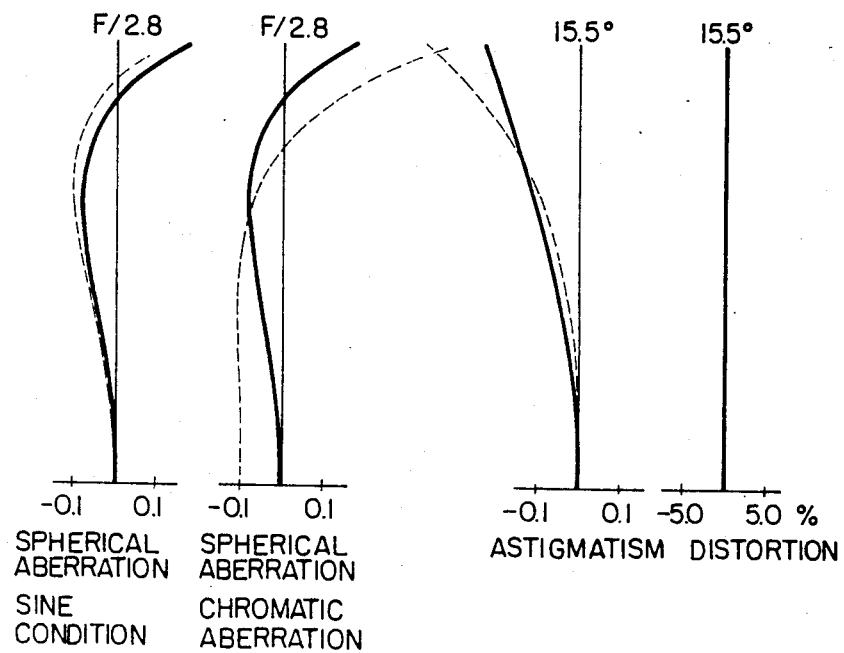
Figure 5:
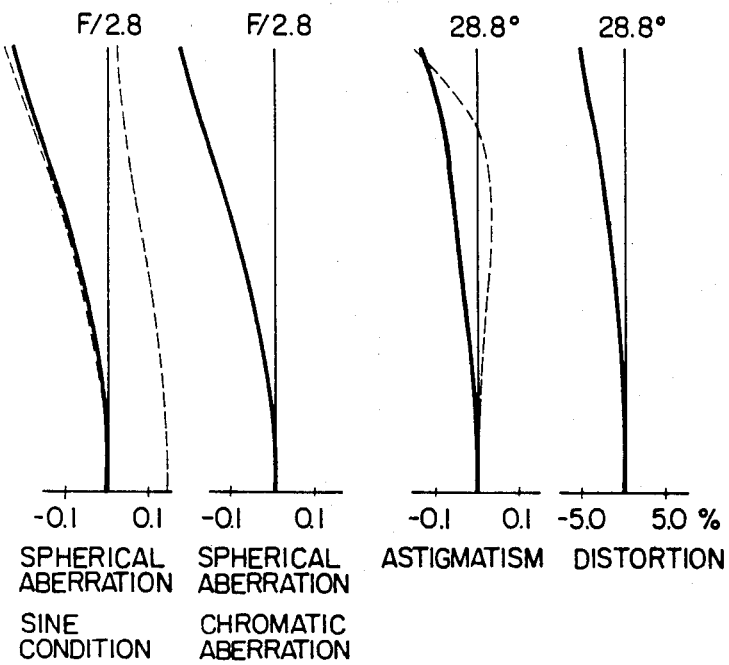
FIGS. 5, 6 and 7 are graphs showing aberrations at the minimum, intermediate and maximum focal lengths according to the Example 2.
Figure 6:
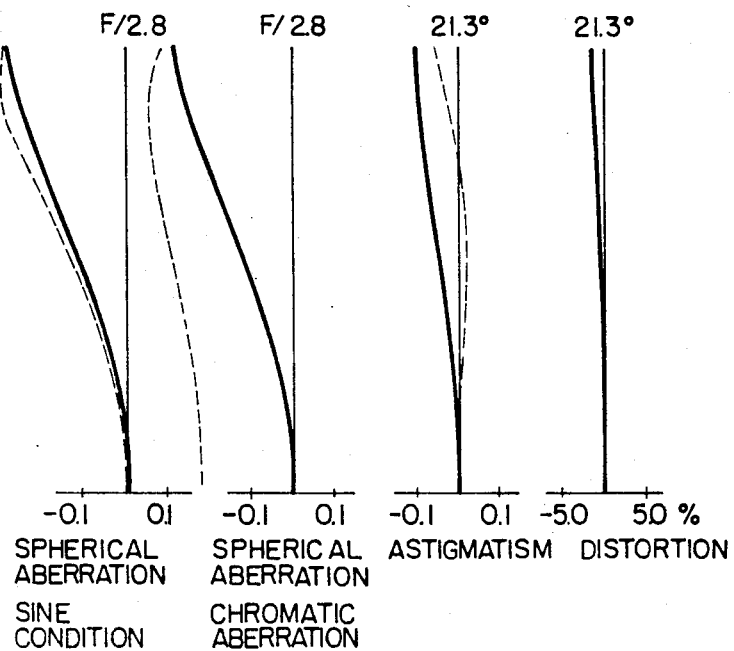
Figure 7:
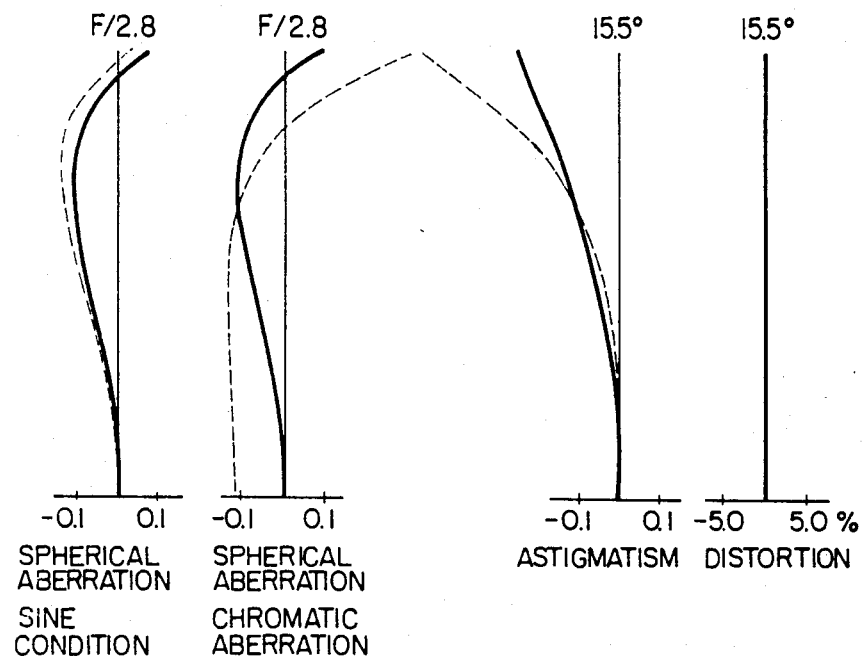
Figure 8:
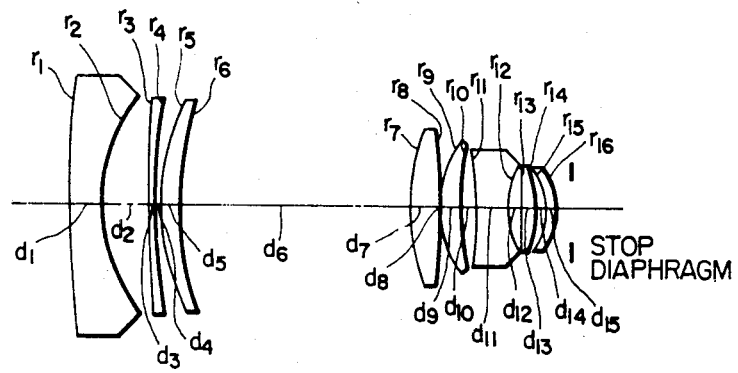
FIG. 8 shows a lens construction according to the Example 3.
Figure 9:
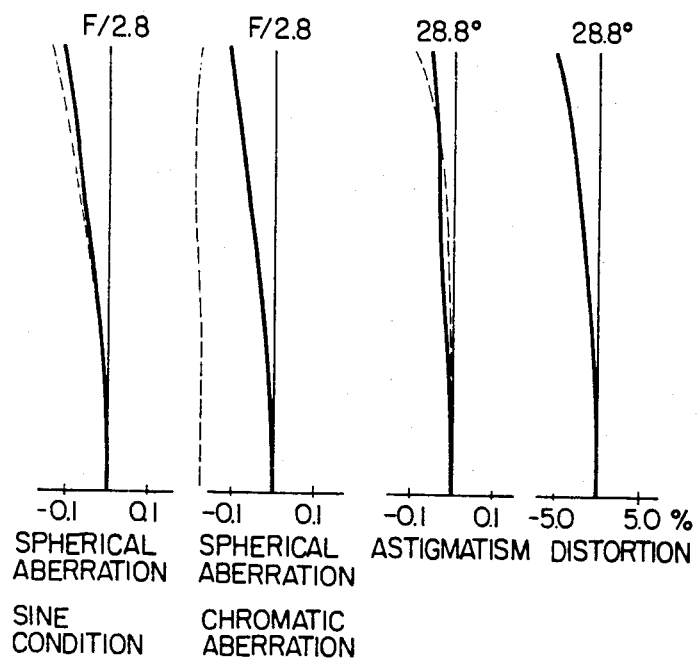
FIGS. 9, 10 and 11 are graphs showing aberrations at the minimum, intermediate and maximum focal lengths according to the Example 3.
Figure 10:
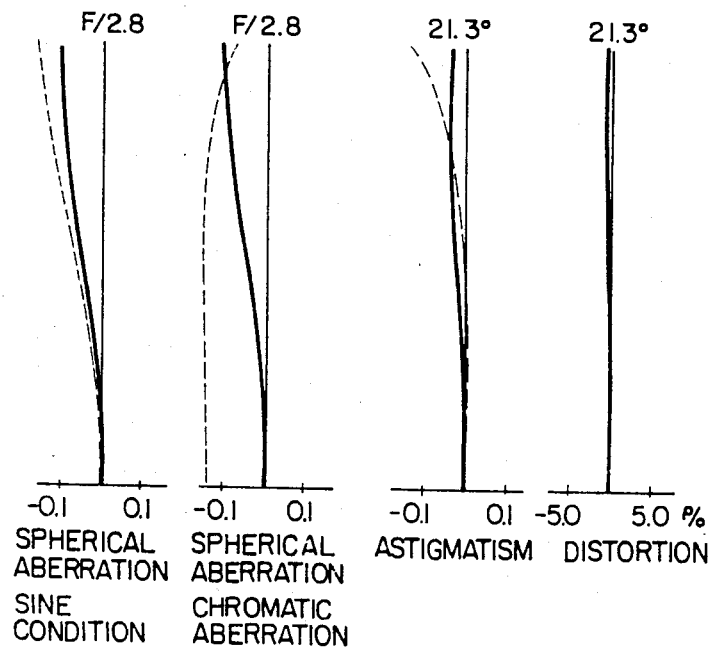
Figure 11:
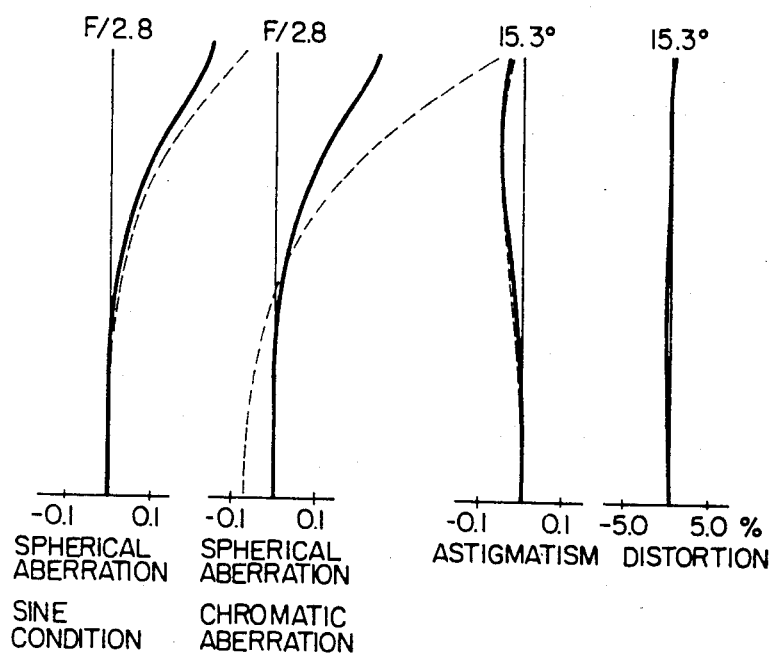

Now, since the rear stop diaphragm type zoom lens has the aforesaid defects, in order to attain the purpose of high compactness and good aberration correction, it is very important to select a range of view angle as well as to determine a desired lens type.

In general, in a zoom lens on the telephoto side, a so-called four-lens group type is frequently used. However, this type has a great number of structural lenses so that the overall physical length of the lens system tends to be increased. As noted above, the diameter of the front lens group is increased so that it is very difficult to obtain a sufficient compactness. Therefore, the lens type is not suitable for the rear stop diaphragm lens system.

In a high zoom ratio zoom lens covering the wide angle focal length range, a three-lens group type is frequently used. Also, this type tends to have a great number of lens elements. Thus, on the like reason, this type is not suitable for the rear stop diaphragm type zoom lens system.

On the other hand, in the case of a so-called two-lens group type zoom lens which is widely used in a wide angle zoom lens, it is possible to compose the lens system of the number of lenses like a standard lens system. Also, in the case of the ordinary two lens group type zoom lens which incorporates therein a stop diaphragm, the stop diaphragm must be moved together with the movement of the second lens group, so that the lens system is mechanically intricate and that constant aperture ratio cannot be maintained during variation of magnification without chamber in the stop diaphragm. Such inherent defects are noted. However, the rear stop diaphragm type zoom lens is free from these defects, and the two-lens group type is most suitable for the rear stop diaphragm zoom lens.

Also, the selection of the range of view angle is important. In other words, under the condition of the rear stop diaphragm type, the inclusion of the super-wide angle focal length makes it very difficult to meet the requirements of aberration correction and compactness.

In case of the two lens group type selected by the present invention, it is possible to cover the range of telephoto focal length by the suitable refractive power arrangement. However, since the lens system is of rear stop diaphragm type and the two lens group type lens is inherently of retrofocus type, it is necessary to increase the diameter of the front lens group in order to maintain a bright aperture ratio. This is not desired.

On the basis of the foregoing description, the lens system according to the present invention meets the following conditions and features. The lens system is composed, in order from the object side, of a first lens group as a whole having a negative refractive power and consisting of two negative lenses and a positive lens and a second lens group as a whole having a positive refractive power and consisting of two or three positive lenses, a negative lens and one or two lenses including at least one positive lens. An aerial space between the lens groups is varied to thereby change the magnification, and a stop diaphragm is disposed behind the overall lens system with stop diaphragm being maintained at a constant position with respect to the focusing surface during variation of magnification. In addition, the zoom lens system satisfies the following conditions.

$$0.6 \leq f_T/|f_I| \leq 0.9 \tag{1}$$

$$1.2 < Z_r \leq 2.3 \tag{2}$$

$$0.6 \leq f_{IIP}/f_{II} \leq 0.75 \tag{3}$$

$$n_{L4} > 1.70 \tag{4}$$

$$R_{LN} < -2.5 f_{IIP}, \; R_{LN} < 0 \tag{5}$$

where $f_T$ is the focal length of the overall lens system at the telephoto end, $Z_r$ is the zoom ratio, $f_I$ is the resultant focal length of the first lens group, $f_{II}$ is the resultant focal length of the second lens group, $f_{IIP}$ is the resultant focal length of the positive lenses disposed in front of the negative lens in the second lens group, $n_{L4}$ is the refractive index of the positive lens disposed closest to the object in the second lens group, and $R_{LN}$ is the radius of curvature of the object-faced surface of the negative lens of the second lens group.

The above described specific conditions will hereinafter be explained.

The conditions (1) and (2) are concerned with a relationship between the minimum and maximum focal lengths of the overall lens system and the focal length of the first lens group and at the same time define the feature of the rear stop diaphragm type which is most important in the present invention.

In other words, the condition (1) defines a refractive power of the first lens group relative to the maximum focal length. Also, this condition means the suitable usage of the lens system in a relatively low magnification range below a unity magnification of image focusing magnification of the second lens group. In connection with this, if a relationship of $f_T/|f_I| - 1$ is selected, the second lens group has a relationship of image focusing in unity.

If the upper limit of the condition (1) is exceeded, in case that the value of $f_T$ is maintained constant, the refractive power of the first lens group is relatively increased so that the usable range of the second lens group is moved on the high magnification side. This necessarily causes the power of the second lens group to be increased due to the shortened length of the overall lens system. This result may be available for the miniaturization of the overall lens system. However, in case of the rear stop diaphragm type zoom lens as in the present invention, a high order coma aberration may be generated with respect to a ray of light deviating from the optical axis and passing through peripheral or marginal portions of the lenses in the second lens group at the maximum focal length end. As a result, it is impossible to maintain a desired aberration compensation. At the same time, with the same condition being met, one-hand zoom lenses can be produced for a compact zoom lens.

Inversely, if the lower limit of the condition (1) is exceeded, although available for aberration compensation, it is not suitable for miniaturization.

In association with the condition (1), the condition (2) is selected to define the refractive power of the first lens group. When the lower limit of the condition (2) is exceeded, it is apparent that no effective zoom lens may be made. Inversely, when the upper limit is exceeded, the overall length is increased or the refractive powers of the respective lens groups are increased. In any case, the high order coma aberration may be generated as mentioned above, at the maximum focal length end. This is not desired.

The refractive power of the first lens group is defined in the conditions (1) and (2) as described above. However, the defined power is relatively small. By composing the first lens group of two negative lens and a single positive lens, it is sufficient to achieve the achromatic effect and other aberration compensation. Namely, although the arrangement of the lenses is free, it is preferable to arrange, in order from from the object side, a negative lens, a negative lens and a positive lens in order to move the principal point to the first lens group rearwardly so that the overall lens system may be miniaturized.

Furthermore, as mentioned above, it is preferable to use the range from the semi-wide angle focal length to the semi-telephoto focal length, covering the standard range of view angle, and it is also preferable to limit the zoom ratio to about two in order to attain a high performance.

On top of this, the zoom lens having a zoom ratio of about two covering the standard range of view angle is easy to handle for general photographing at the standard view angle, snap photographing and portrait for any object to be photographed. Such a zoom lens is particularly popular. In view of this fact, the present invention is useful.

Also, in general, a second lens group of a two lens group type is constructed such that in order to attain the miniaturization of the overall lens system and to maintain aberration, particularly, curvature of field in good conditions, the Petzval sum is high and the principal point is positioned forwardly like a telephoto type.

In the lens system according to the present invention, the system is composed, in order from the object side, of two or three positive lenses, a single negative lens and one or two lenses including at least one positive lens in order to meet the above described conditions.

The condition (3) relates to the resultant focal length of two or three positive lenses disposed in front of the negative lens in the above described second lens group.

If the upper limit of the condition (3) is exceeded, the function similar to the telephoto lens is made weak so that while available for the Petzval sum, it is disadvantageous for the miniaturization. Inversely, if the lower limit of the condition (3) is exceeded, the principal point of the second lens group is further moved forwardly, so that it is available for the miniaturization but the refractive powers of the respective lens element are increased. As a result, a high order coma aberration tends to be generated with respect to the ray of light deviating from the optical axis and the spherical aberration which is insufficiently compensated for may be generated.

The condition (4) relates to a refractive index of the positive lens disposed closest to the object in the second lens group. In order to maintain the Petzval sum at a high value, it is available to use a possibly low refractive glass but since particularly, at the maximum focal length end the ray of light deviating from the optical axis passes through the position remote from the optical axis in the rear stop diaphragm type, the high order coma aberration is liable to be generated. Therefore, it is necessary to make the above described positive lens of possibly high refractive glass to thereby limit the radii of curvature of both surfaces thereof in order to limit the generation of the high order coma aberration.

Namely, when the lower limit of the condition (4) is exceeded, the high order coma aberration may be generated at the above described positive lens at the maximum focal length end so that it is difficult to the good aberration compensation.

The condition (5) relates to the radius of curvature of the object-faced surface of the negative lens in the second lens group. The refractive power of the positive lens group having two or three positive lenses in front of the above described negative lens is so designed that it meets the condition (3) in consideration of the compactness and the aberration compensation. This power is stronger than that of the second lens group. In particular, the coma aberration and astigmatism may be generated with respect to the ray of light deviating from the optical axis. One function of this negative lens is to compensate for the various aberrations generated in the above described positive lens group. Unless the condition (5) is met, the radius of curvature of the object-faced surface of the negative lens in question is too short so that the various aberrations are excessively compensated for or the lens becomes a negative meniscus lens convex to the object. As a result, the radius of curvature of the image-faced surface is too short so that an excessively compensated spherical aberration is generated. In any case, it is not desired for maintaining the performance in a good condition.

Data of the Example of the present invention will now be described.

In the Example, f is the focal length, R is the radius of curvature, D is the lens thickness or the aerial space between the adjacent lenses, N is the refractive index, and $\nu$ is the Abbe number.

EXAMPLE 1

| | $f = 20.6 \sim 38.6$ | | $F_{NO}$ 1 : 2.8 | |
|---|---|---|---|---|
| Lens Surface | R | D | | |
| 1 | 40.700 | 1.53 | $N_1$ 1.80610 | $\nu_1$ 40.9 |
| 2 | 23.370 | 9.10 | | |
| 3 | −54.490 | 1.36 | $N_2$ 1.61800 | $\nu_2$ 63.4 |
| 4 | 425.000 | 0.10 | | |
| 5 | 60.078 | 2.43 | $N_3$ 1.80518 | $\nu_3$ 25.4 |
| 6 | 126.230 | variable | | |
| 7 | 75.210 | 2.98 | $N_4$ 1.77250 | $\nu_4$ 49.6 |
| 8 | −122.000 | 0.10 | | |
| 9 | 19.175 | 4.26 | $N_5$ 1.72916 | $\nu_5$ 54.7 |
| 10 | 50.501 | 0.10 | | |
| 11 | 22.534 | 2.53 | $N_6$ 1.61800 | $\nu_6$ 63.4 |
| 12 | 37.050 | 2.53 | | |
| 13 | −100.246 | 2.56 | $N_7$ 1.80518 | $\nu_7$ 25.4 |
| 14 | 15.600 | 4.19 | | |
| 15 | 68.000 | 2.54 | $N_8$ 1.80610 | $\nu_8$ 40.9 |
| 16 | −29.300 | | | |

Variable Distance
f   20.6   28   38.6
$D_6$  31.27  14.16  1.08
$f_T/|f_I| = 0.791$
$Z_r = 1.87$
$f_{IIP}/f_{II} = 0.700$
$n_{L4} = 1.77250$
$R_{LN} = -100.246 = -5.24 \cdot f_{IIP}$

EXAMPLE 2

| | $f = 20.6 \sim 38.6$ | | $F_{NO}$ 1:2.8 | |
|---|---|---|---|---|
| Lens Surface | R | D | | |
| 1 | 40.700 | 1.60 | $N_1$ 1.83481 | $\nu_1$ 42.7 |
| 2 | 23.588 | 9.12 | | |
| 3 | −54.490 | 1.36 | $N_2$ 1.61800 | $\nu_2$ 63.4 |
| 4 | 485.000 | 0.10 | | |
| 5 | 60.078 | 2.43 | $N_3$ 1.80518 | $\nu_3$ 25.4 |
| 6 | 126.230 | variable | | |
| 7 | 75.210 | 3.06 | $N_4$ 1.80400 | $\nu_4$ 46.6 |
| 8 | −123.305 | 0.10 | | |
| 9 | 19.175 | 4.26 | $N_6$ 1.72916 | $\nu_5$ 54.7 |
| 10 | 50.501 | 0.10 | | |
| 11 | 22.534 | 2.53 | $N_6$ 1.61800 | $\nu_6$ 63.4 |
| 12 | 37.050 | 2.08 | | |
| 13 | −115.546 | 2.94 | $N_7$ 1.80518 | $\nu_7$ 25.4 |
| 14 | 15.718 | 4.44 | | |
| 15 | 89.373 | 2.22 | $N_8$ 1.83481 | $\nu_8$ 42.7 |
| 16 | −29.702 | | | |

Variable Distance
f   20.6   28.0   38.6
$D_4$  31.21  14.10  1.02
$f_T/|f_I| = 0.789$
$Z_r = 1.87$
$f_{IIP}/f_{II} = 0.694$
$n_{L4} = 1.80400$
$R_{LN} = -115.546 = -6.1 \cdot f_{IIP}$

EXAMPLE 3

| | $f = 20.5 \sim 39.0$ | | $F_{NO}$ 1:2.8 | |
|---|---|---|---|---|
| Lens Surface | R | D | | |
| 1 | 211.464 | 5.25 | $N_1$ 1.74100 | $\nu_1$ 52.7 |
| 2 | 28.909 | 7.78 | | |
| 3 | 203.911 | 1.28 | $N_2$ 1.69680 | $\nu_2$ 55.5 |
| 4 | 112.942 | 0.72 | | |
| 5 | 38.330 | 3.27 | $N_3$ 1.80518 | $\nu_3$ 25.4 |
| 6 | 53.000 | variable | | |
| 7 | 34.280 | 5.02 | $N_4$ 1.75500 | $\nu_4$ 52.3 |
| 8 | −103.398 | 0.10 | | |
| 9 | 19.175 | 3.28 | $N_5$ 1.72916 | $\nu_5$ 54.7 |
| 10 | 47.400 | 2.38 | | |
| 11 | −73.400 | 5.78 | $N_6$ 1.80518 | $\nu_6$ 25.4 |
| 12 | 15.658 | 2.05 | | |
| 13 | 224.007 | 2.19 | $N_7$ 1.88300 | $\nu_7$ 40.8 |
| 14 | −24.846 | 1.85 | | |
| 15 | −10.968 | 1.78 | $N_8$ 1.88300 | $\nu_8$ 40.8 |
| 16 | −11.533 | | | |

Variable Distance
f   20.5   2.80   39.0
$D_6$  38.41  17.29  1.00
$f_T/|f_I| = 0.710$
$Z_r = 1.90$
$f_{IIP}/f_{II} = 0.655$
$n_{L4} = 1.75500$
$R_{LN} = -73.4 = -3.8 \cdot f_{IIP}$

What is claimed is:

1. A rear stop diaphragm type zoom lens composed, in order from the object side, of a first lens group as a whole having a negative refractive power and consisting of two negative lenses and a positive lens and a second lens group as a whole having a positive refractive power and consisting of three positive lenses, a negative lens and a positive lens, in which an aerial space between said lens groups is varied to thereby vary the magnification, and a stop diaphragm is disposed behind the overall lens system with the stop diaphragm being maintained at a constant position with respect to the focusing surface during variation of magnification, the zoom lens satisfying the following conditions:

$$0.6 \leq f_T/|f_I| \leq 0.9 \tag{1}$$

$$1.2 < Z_r \leq 2.3 \tag{2}$$

$$0.6 \leq f_{IIP}/f_{II} \leq 0.75 \tag{3}$$

$$n_{L4} > 1.70 \tag{4}$$

$$R_{LN} < -2.5 f_{IIP}, R_{LN} < 0 \tag{5}$$

where $f_T$ is the focal length of the overall lens system at the telephoto end,
$Z_r$ is the zoom ratio,
$f_I$ is the resultant focal length of the first lens group, $f_{II}$ is the resultant focal length of the second lens group, $f_{IIP}$ is the resultant focal length of the positive lenses disposed in front of the negative lens in the second lens group, $n_{L4}$ is the refractive index of the positive lens disposed closest to the object in the second lens group, and $R_{LN}$ is the radius of curvature of the object-faced surface of the negative lens of the second lens group.

2. A rear stop diaphragm type zoom lens composed, in order from the object side of a first lens group as a whole having a negative refractive power and consisting of two negative lenses and a positive lens and a second lens group as a whole having a positive refractive power and consisting of three positive lenses, a negative lens and a positive lens, in which an aerial space between said lens groups is varied to thereby vary the magnification, and a stop diaphragm is disposed behind the overall lens system with the stop diaphragm being maintained at a constant position with respect to the focusing surface during variation of magnification, the zoom lens satisfying the following conditions:

| f = 20.6 ~ 38.6 | | $F_{NO}$ 1 : 2.8 | | |
|---|---|---|---|---|
| Lens Surface | R | D | | |
| 1 | 40.700 | 1.53 | $N_1$ 1.80610 | $\nu_1$ 40.9 |
| 2 | 23.370 | 9.10 | | |
| 3 | −54.490 | 1.36 | $N_2$ 1.61800 | $\nu_2$ 63.4 |
| 4 | 425.000 | 0.10 | | |
| 5 | 60.078 | 2.43 | $N_3$ 1.80518 | $\nu_3$ 25.4 |
| 6 | 126.230 | variable | | |
| 7 | 75.210 | 2.98 | $N_4$ 1.77250 | $\nu_4$ 49.6 |
| 8 | −122.000 | 0.10 | | |
| 9 | 19.175 | 4.26 | $N_5$ 1.72916 | $\nu_5$ 54.7 |
| 10 | 50.501 | 0.10 | | |
| 11 | 22.534 | 2.53 | $N_6$ 1.61800 | $\nu_6$ 63.4 |
| 12 | 37.050 | 2.53 | | |
| 13 | −100.246 | 2.56 | $N_7$ 1.80518 | $\nu_7$ 25.4 |
| 14 | 15.600 | 4.19 | | |
| 15 | 68.000 | 2.54 | $N_8$ 1.80610 | $\nu_8$ 40.9 |
| 16 | −29.300 | | | |

Variable Distance
f   20.6   28   38.6
$D_6$   31.27   14.16   1.08
$f_T/|f_I| = 0.791$
$Z_r = 1.87$
$f_{IIP}/f_{II} = 0.700$
$n_{L4} = 1.77250$
$R_{LN} = -100.246 = -5.24 \cdot f_{IIP}$ where f is the overall focal length, R is the radius of curvature, D is the lens thickness or the aerial space between the adjacent lenses, N is the refractive index, $\nu$ is the Abbe number, $f_T$ is the overall focal length of the telephoto end, $Z_r$ is the zoom ratio, $f_I$ is the resultant focal length of the first lens group, $f_{II}$ is the resultant focal length of the second lens group, $f_{IIP}$ is the resultant focal length of the positive lenses disposed in front of the negative lens in the second lens group, $n_{L4}$ is the refractive index of the positive lens disposed closest to the object in the second lens group, and $R_{LN}$ is the radius of curvature of the object-faced surface of the negative lens of the second lens group.

3. A rear stop diaphragm type zoom lens composed, in order from the object side, of a first lens group as a whole having a negative refractive power and consisting of two negative lenses and a positive lens and a second lens group as a whole having a positive refractive power and consisting of three positive lenses, a negative lens and a positive lens, in which an aerial space between said lens groups is varied to thereby vary the magnification, and a stop diaphragm is disposed behind the overall lens system with the stop diaphragm being maintained at a constant position with respect to the focusing surface during variation of magnification, the zoom lens satisfying the following conditions:

| f = 20.6 ~ 38.6 | | $F_{NO}$ 1:2.8 | | |
|---|---|---|---|---|
| Lens Surface | R | D | | |
| 1 | 40.700 | 1.60 | $N_1$ 1.83481 | $\nu_1$ 42.7 |
| 2 | 23.588 | 9.12 | | |
| 3 | −54.490 | 1.36 | $N_2$ 1.61800 | $\nu_2$ 63.4 |
| 4 | 485.000 | 0.10 | | |
| 5 | 60.078 | 2.43 | $N_3$ 1.80518 | $\nu_3$ 25.4 |
| 6 | 126.230 | variable | | |
| 7 | 75.210 | 3.06 | $N_4$ 1.80400 | $\nu_4$ 46.6 |
| 8 | −123.305 | 0.10 | | |
| 9 | 19.175 | 4.26 | $N_6$ 1.72916 | $\nu_5$ 54.7 |
| 10 | 50.501 | 0.10 | | |
| 11 | 22.534 | 2.53 | $N_6$ 1.61800 | $\nu_6$ 63.4 |
| 12 | 37.050 | 2.08 | | |
| 13 | −115.546 | 2.94 | $N_7$ 1.80518 | $\nu_7$ 25.4 |
| 14 | 15.718 | 4.44 | | |
| 15 | 89.373 | 2.22 | $N_8$ 1.83481 | $\nu_8$ 42.7 |
| 16 | −29.702 | | | |

Variable Distance
f   20.6   28.0   38.6
$D_4$   31.21   14.10   1.02
$f_T/|f_I| = 0.789$
$Z_r = 1.87$
$f_{IIP}/f_{II} = 0.694$
$n_{L4} = 1.80400$
$R_{LN} = -115.546 = -6.1 \cdot f_{IIP}$ where f is the overall focal length, R is the radius of curvature, D is the lens thickness or the aerial space between the adjacent lenses, N is the refractive index, $\nu$ is the Abbe number, $f_T$ is the focal length of the overall lens system at the telephoto end, $Z_r$ is the zoom ratio, $f_I$ is the resultant focal length of the first lens group, $f_{II}$ is the resultant focal length of the second lens group, $f_{IIP}$ is the resultant focal length of the positive lenses disposed in front of the negative lens in the second lens group, $n_{L4}$ is the refractive index of the positive lens disposed closest to the object in the second lens group, and $R_{LN}$ is the radius of curvature of the object-faced surface of the negative lens of the second lens group.

4. A rear stop diaphragm type zoom lens composed, in order from the object side, of a first lens group as a whole having a negative refractive power and consisting of two negative lenses and a positive lens and a second lens group as a whole having a positive refractive power and consisting of two positive lenses, a negative lens, a positive lens and a lens, in which an aerial space between said lens groups is varied to thereby vary the magnification, and a stop diaphragm is disposed behind the overall lens system with the stop diaphragm being maintained at a constant position with respect to the focusing surface during variation of magnification, the zoom lens satisfying the following conditions:

| Lens Surface | R | D | | |
|---|---|---|---|---|
| | f = 20.5 ~ 39.0 | | $F_{NO}$ 1:2.8 | |
| 1 | 211.464 | 5.25 | $N_1$ 1.74100 | $\nu_1$ 52.7 |
| 2 | 28.909 | 7.78 | | |
| 3 | 203.911 | 1.28 | $N_2$ 1.69680 | $\nu_2$ 55.5 |
| 4 | 112.942 | 0.72 | | |
| 5 | 38.330 | 3.27 | $N_3$ 1.80518 | $\nu_3$ 25.4 |
| 6 | 53.000 | variable | | |
| 7 | 34.280 | 5.02 | $N_4$ 1.75500 | $\nu_4$ 52.3 |
| 8 | −103.398 | 0.10 | | |
| 9 | 19.175 | 3.28 | $N_5$ 1.72916 | $\nu_5$ 54.7 |
| 10 | 47.400 | 2.38 | | |
| 11 | −73.400 | 5.78 | $N_6$ 1.80518 | $\nu_6$ 25.4 |
| 12 | 15.658 | 2.05 | | |
| 13 | 224.007 | 2.19 | $N_7$ 1.88300 | $\nu_7$ 40.8 |
| 14 | −24.846 | 1.85 | | |
| 15 | −10.968 | 1.78 | $N_8$ 1.88300 | $\nu_8$ 40.8 |
| 16 | −11.533 | | | |

Variable Distance

| f | 20.5 | 2.80 | 39.0 |
|---|---|---|---|
| $D_6$ | 38.41 | 17.29 | 1.00 |

$f_T/|f_I| = 0.710$
$Z_r = 1.90$
$f_{IIP}/f_{II} = 0.655$ $n_{L4} = 1.75500$
$R_{LN} = -73.4 = -3.8 \cdot f_{IIP}$ where
f is the overall focal length,
R is the radius of curvature,
D is the lens thickness or the aerial space between the adjacent lenses,
N is the refractive index,
$\nu$ is the Abbe number,
$f_T$ is the focal length of the overall lens system at the telephoto end,
$Z_r$ is the zoom ratio,
$f_I$ is the resultant focal length of the first lens group,
$f_{II}$ is the resultant focal length of the second lens group,
$f_{IIP}$ is the resultant focal length of the positive lenses disposed in front of the negative lens in the second lens group,
$n_{L4}$ is the refractive index of the positive lens disposed closest to the object in the second lens group, and
$R_{LN}$ is the radius of curvature of the object-faced surface of the negative lens of the second lens group.

* * * * *